Aug. 16, 1927.

H. F. SMITH 1,639,114

HEATING APPARATUS

Filed Dec. 24, 1921

Witnesses
Charles E. Greene
Edmund C. Sylvis

Inventor
Harry F. Smith
By Greer Marshal
Attorney

Aug. 16, 1927.

H. F. SMITH

HEATING APPARATUS

Filed Dec. 24, 1921

Witnesses
Charles E. Greene
Edmund C. Sykes

Inventor
Harry F. Smith
By Greer Marechal
Attorney

Aug. 16, 1927.

H. F. SMITH 1,639,114

HEATING APPARATUS

Filed Dec. 24, 1921

Witnesses
Edmund P Sykes
Charles E. _____

Inventor
Harry F. Smith
By _____ Marshall
Attorney

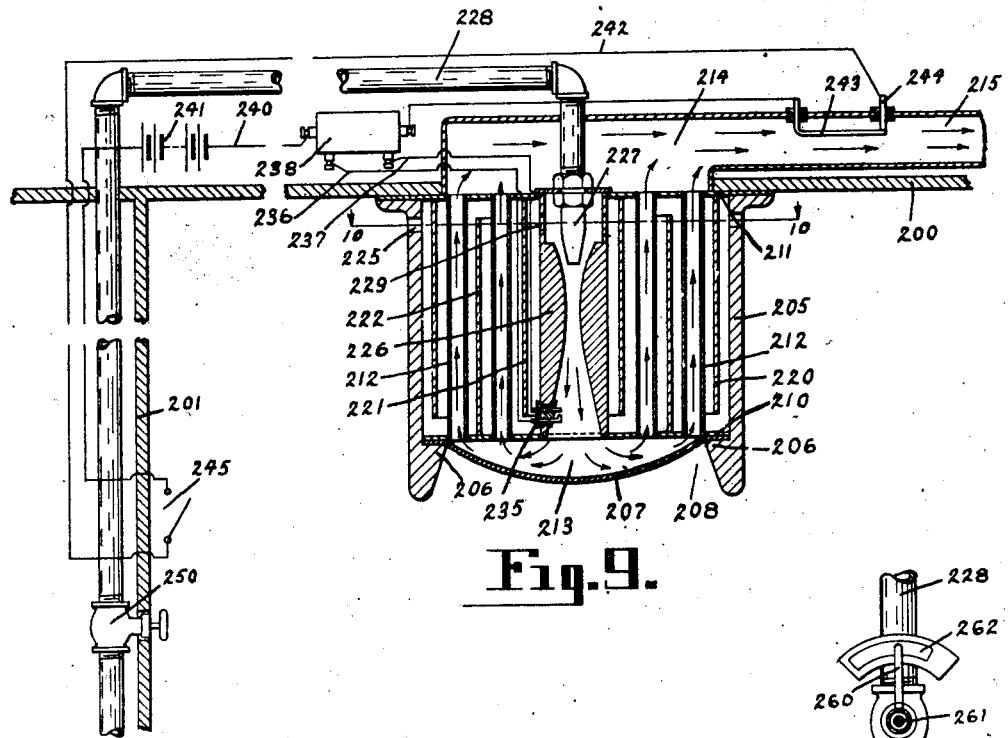

Patented Aug. 16, 1927.

1,639,114

UNITED STATES PATENT OFFICE.

HARRY F. SMITH, OF DAYTON, OHIO, ASSIGNOR TO THE GAS RESEARCH COMPANY, OF DAYTON, OHIO, A CORPORATION OF OHIO.

HEATING APPARATUS.

Application filed December 24, 1921. Serial No. 524,785.

This invention relates to heating apparatus such as is used for heating houses, and the like, and more particularly to heating apparatus comprising heaters of the character generally known as radiant heaters.

One of the objects of the invention is to provide heating apparatus of this character, particularly designed for utilizing combustible gas, or the like, which functions primarily for heating by means of direct radiation, rather than by convection, which is the usual method of heat transfer in household heating, and which is of such character that the products of combustion do not escape into the atmosphere of the room, or space, in which the heater is being used.

Another object of the invention is to provide heating apparatus of this general character which is provided with means for utilizing the sensible heat of the products of combustion for preheating the combustible mixture, to thus give a greater heating efficiency.

Another object of the invention is to provide a heating apparatus of this general character, which is so constructed as to permit of automatically igniting the combustible mixture, so that it may be turned on and off, just as is at present the practice in connection with electric lights, for example.

Still another object of the invention is to provide a radiant gas heater, in which the combustion chamber is closed to prevent the products of combustion escaping into the surrounding atmosphere, having ignition means operable from a distance so that the heater may be installed in the ceiling, or like place, and the gas turned on and ignited by pressing a button as is the case with electric appliances.

Other objects and advantages of the present invention will be apparent from the description set out below when taken in connection with the accompanying drawing.

In the drawing in which like characters of reference designate like parts throughout the several views thereof, Fig. 1 is a front elevation of the form of apparatus embodying this invention;

Fig. 9 is a sectional view, somewhat diagrammatic in its nature, through still another form of heating apparatus, particularly designed for positioning in the ceiling of a room, and provided with means for automatically igniting the gas;

Fig. 10 is a sectional view along the line 10—10 of Fig. 9;

Fig. 11 is a fragmentary view of a modified form of control mechanism for use in connection with the form of heating apparatus shown in Fig. 9;

Fig. 12 is a front view of the mechanism shown in Fig. 11; and

Fig. 13 is a sectional view along the line 13—13 of Fig. 11.

Figure 1:
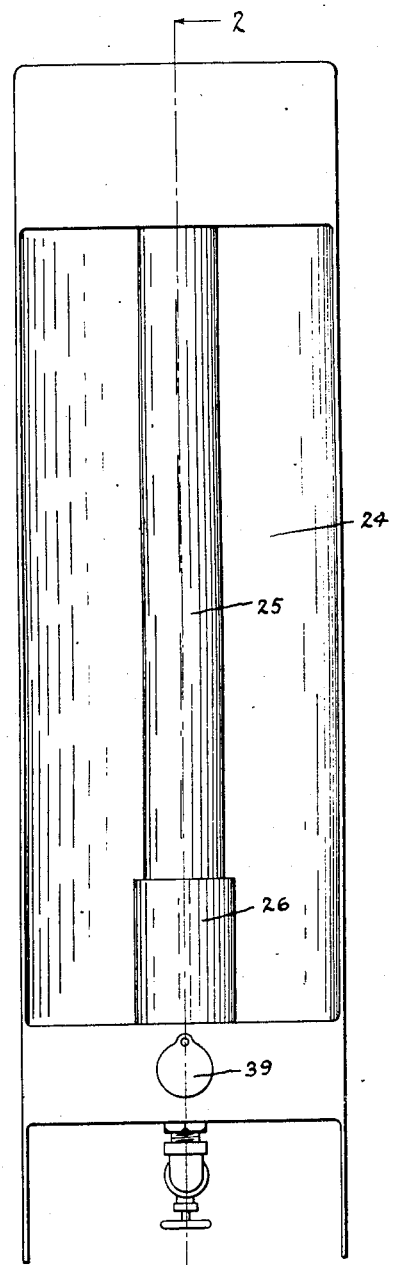

Of course gas heaters, of various types, have been used for years, and also, so called radiant heaters have been known and used for some time, some of these heaters being adapted to utilize electrical energy, and others to utilize a combustible gas, such as natural gas, city gas, producer gas, and the like. The most serious defect present in the various types of gas heaters heretofore known and used, and probably the greatest limitation upon their general applicability and their more wide spread use, has been that faultiness of design as a result of which the products of combustion are permitted to escape, in greater or less degree, into the atmosphere of the room being heated. This is a very serious and objectionable feature, so much so, that, as is well known, numerous restrictive regulations have been promulgated throughout the country by health officers, and other officials, governing the use of heating apparatus of this character.

In each of the forms of heating apparatus shown herein this very serious and objectionable feature is entirely eleminated, the apparatus being so constructed that the products of combustion are excluded from the room, and are caused to pass off through a vent pipe to the flue or stack. This is accomplished, in each form of apparatus illustrated in the drawing, by providing a refractory member, which, when heated, serves as a source of radiant heat, with which is associated a combustion chamber, this member being heated by burning a combustible mixture within the combustion chamber, the construction being such that the resulting products of combustion pass off to the stack.

Figure 2:
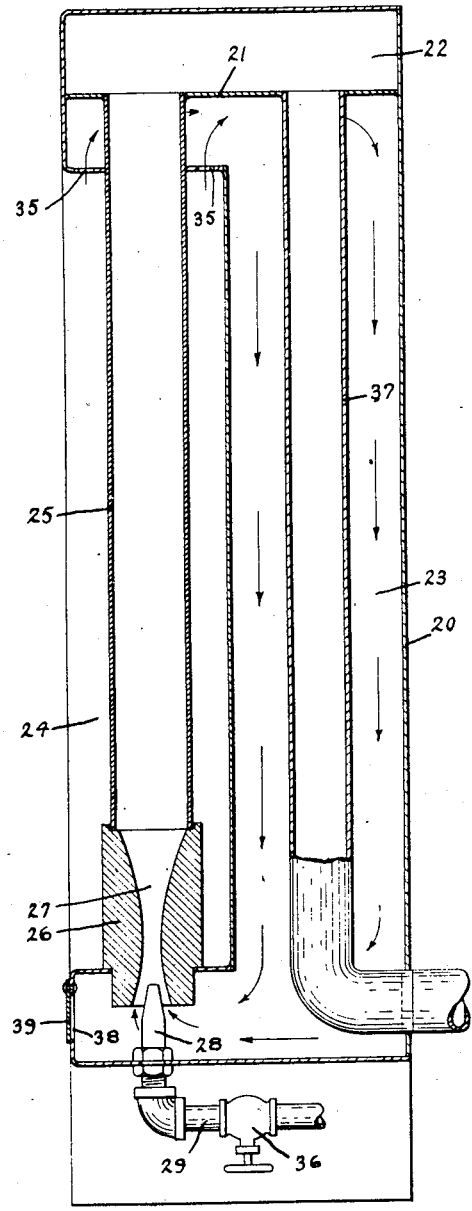
Fig. 2 is a sectional view of the form of apparatus shown in Fig. 1, the section being along the line 2—2.

A simple form of apparatus of this character is shown in Figs. 1 and 2 in which the numeral 20 designates a frame or body member, preferably of some metal. This body member is so constructed that its interior, is substantially gas tight, and is divided by the partition 21 into two chambers 22 and 23. The front of the frame or body member 20 is provided with a pocket 24, within which is positioned the refractory member 25. This member, as shown, consists of a metallic tube, composed of any suitable metal which is sufficiently resistant to oxidation, or other forms of deterioration when highly heated. Preferably this tube 25 is composed of some one of the chromium nickel alloys now widely used commercially, such for instance as the well known, so called, Q-metal, and is, therefore, imperforate. The upper end of the tube 25 is positioned within an opening in the partition 21, the interior of the tube 25 thus being in connection with the interior of the chamber 22. The lower end of the tube 25 rests upon the upper end of a member 26, having a passage 27 therein constructed to serve as a Venturi tube, and to cooperate with the nozzle 28, connected to the gas pipe 29, these two members together serving as an induction burner, the construction shown being conventional. The nozzle 28 passes upwardly through the bottom of the body member 20 and terminates within the chamber 23 therein, the lower end of the member 26 also opening into the chamber 23 so that the interior of the refractory tube 25 is connected at its lower end to the interior of the chamber 23. A plurality of air inlet openings 35 are provided in that part of the wall of the body member 20, which defines the upper end of the pocket 24, these air inlet openings being located around the refractory member 25. These openings lead into the chamber 23. During operation of the device, the valve 36, which controls the flow of gas through the supply pipe 29 is open to permit the flow of gas from the nozzle 28, which, being under pressure, induces a flow of air from the chamber 23 through the venturi 27 into the refractory member 25. The resulting combustible mixture, when ignited, burns, the flame and hot products of combustion passing through the refractory member 25 and in contact with the inner side to heat it to a very high temperature.

Leading off from the chamber 22 is a vent pipe 37, through which the products of combustion escape from the chamber 22 and pass to flue or stack. This pipe, preferably, passes downwardly throughout the length of the chamber 23 the construction being such that the air which flows in through the inlet opening 35 will pass over and along this pipe as it flows downwardly to the burner elements at the lower end of the chamber. This is in effect a type of recuperator, and as a result of this construction the air before it is mixed with the gas is preheated, to give a resulting higher combustion temperature within the refractory element 25, and thus a higher effective temperature to that element. As a consequence greater heating effect is secured and the efficiency of the device is much increased.

An opening 38, closed by a slidable cover 39 is provided for permitting access to the burner so that the combustible mixture may be ignited.

If desired other types of refractory elements may be used, for example, a tube of fire clay, carborundum, or other similar refractory material may be used in place of the metallic tube described. Of course the device would function satisfactorily even though it were not so constructed that the products of combustion are necessarily led off to flue or vent, and thus entirely prevented from escaping into the atmosphere, but as so constructed it would be, despite its increased efficiency and greater effectiveness due to the use of the recuperator, open to the same objection as other gas heaters now used in which the products of combustion are not vented.

Figure 4:
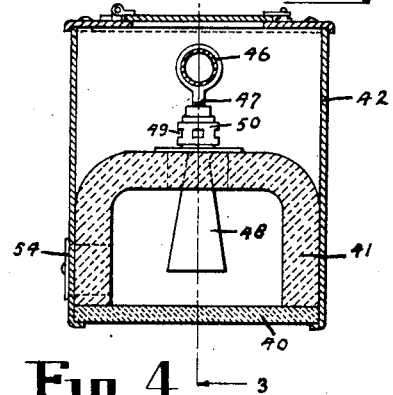
Fig. 4 is a sectional view along the line 4—4 of Fig. 3.
Figure 3:
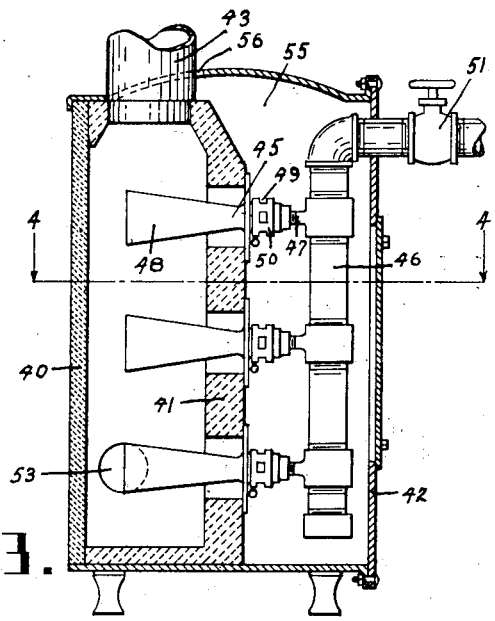
Fig. 3 is a sectional view through a somewhat modified form of apparatus along the line 3—3 of Fig. 4.

In Figs. 3 and 4 is shown a slightly modified form of heater. In this form of apparatus the refractory, or radiating element, is in the form of a flat imperforate plate 40, cooperating with a trough shaped member 41, preferably composed of fire clay, or similar heat resisting material, which, together with the refractory plate 40 serves as the combustion chamber of the device. The members 40 and 41 are positioned within a metallic frame or body member 42, which is so constructed that these two members are held in substantially gas tight connection to prevent the escape of products of combustion into the atmosphere, the vent pipe 43 being connected to the combustion chamber at the upper end thereof, to lead off all products of combustion. Instead of a single burner opening into the lower end of the combustion chamber, a plurality of induction burners 45 are provided, which are shown as of conventional design, and are, therefore, not illustrated in detail. Gas passes in from the supply pipe 46, through the nozzle 47, and air passes in through suitable openings at the base of the Venturi element 48, which openings register with the openings 49 in the ring 50, which, by proper rotation controls the effective opening of the air inlet ports to thus control the composition of the combustible mixture. A suitable control valve 51 is positioned within the supply pipe 46. An opening 53, controlled by a suitable cover 54 is provided in the side of the member 41 to permit of igniting the combustible mixture within the combustion chamber.

The refractory element is illustrated as consisting of a plate of some such material as carborundum, or the like; but, as set out above, any other suitable type of refractory material may be used if desired. Air, for combustion, enters the space 55 through the opening 56, and is preheated by contact with the heated refractory member 41. But a recuperator, associated with the vent pipe, may also be used, if desired.

Figure 6:
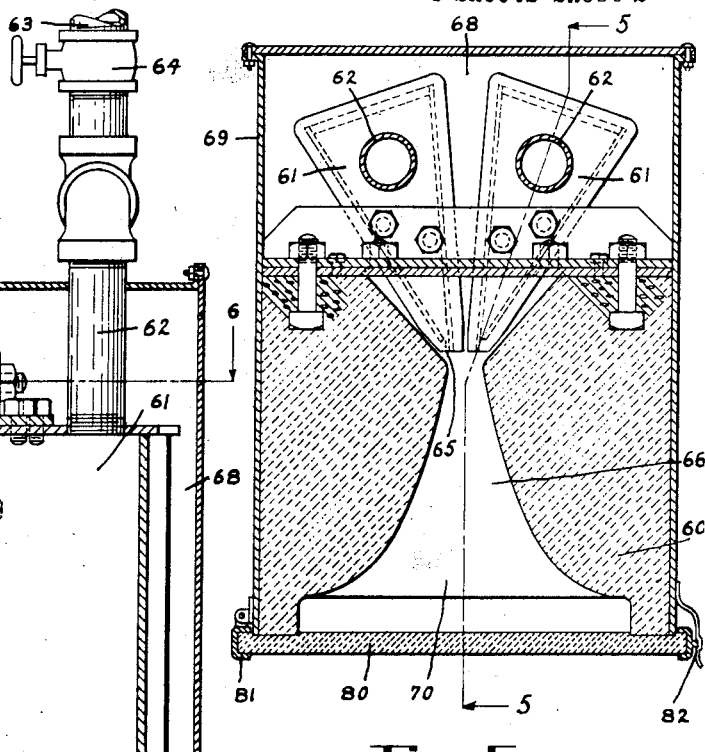
Fig. 6 is a sectional view along the line 6—6 of Fig. 5.
Figure 5:
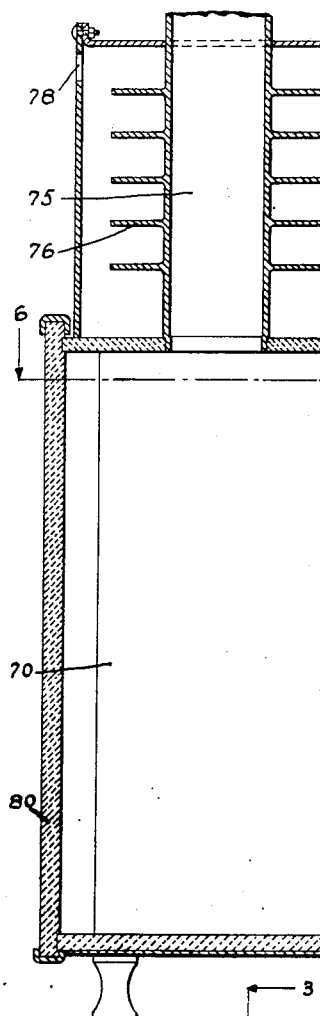
Fig. 5 is a sectional view of another modified form of apparatus along the line 5—5 of Fig. 6.

And in Figs. 5 and 6 is shown a form of apparatus which differs primarily from that shown in Figs. 3 and 4 in the type of burner used, in which such a recuperator is provided. In this form of apparatus the member 60, which corresponds to the member 41 of Figs. 3 and 4, itself constitutes a part of the burner element, the space within this member being so constructed as to function as a Venturi tube in connection with the gas supply nozzles 61, a plurality of these nozzles being provided. Whereas in the form of apparatus shown in Figs. 3 and 4 a plurality of induction burners of conventional design are used, in this particular modification a type of burner is used in which the gas is injected into the Venturi tube through a long narrow slot, so that a continuous flame is secured throughout substantially the entire length, that is the up and down length, of the combustion chamber. Each of the nozzles 61 consists of a metallic member which is substantially triangular in cross section, gas being introduced, under suitable pressure, into the interior of each of these members through a pipe 62 which is in turn a branch of the main supply pipe 63, a suitable valve 64 being positioned within the pipe 63 to control the supply of gas to the burners as desired. Each of the members 61 is provided at one edge with a narrow slot 65, through which the gas escapes therefrom, the construction being such that the gas escapes through this slot in a very thin sheet and at considerable velocity. The member 61 is so positioned, when the device is assembled, that this slot lies within the mouth of the Venturi passage 66, in the member 60, and as the gas escapes through the slot at high velocity a flow of air from the space 68 within the frame or body member 69 is induced to form a combustible mixture which passes into the combustion space 70, where it is ignited, in any suitable manner, and burned, the hot products of combustion passing off through the vent pipe 75, which is in turn connected to a flue or stack.

That part of the vent pipe which is adjacent the combustion chamber is provided with a plurality of ribs or fins 76 and the frame or body member 69 is so constructed that this part of the pipe and the ribs or fins carried thereby are surrounded by an extension 77 of the frame or body member, the space within this extension 77 forming a continuation of the space 68 in the main part of the frame. An opening 78 is provided which serves as an air inlet opening, air flowing therethrough into the space within the frame or body member whence it is introduced through the burner elements into the combustion chamber. This air as it flows downwardly from the air inlet opening to the burners is constrained to pass over and around the ribs 76 and the vent pipe 75 and thus absorbs a substantial amount of the sensible heat of the outgoing products of combustion. Any desired means may be supplied for permitting access to the interior of the combustion space 70 to ignite the gas, one form being shown in the drawing in which the refractory element 80 is mounted within a frame work 81, which is hingedly connected at one side to the body member 69, the other side being provided with a suitable catch 82. By means of this construction, upon proper manipulation of the catch 82, which catch may be of any desired conventional construction, the frame 81 with the refractory element therein, may be swung upon its hinges to permit ready access to the interior of the combustion space, so that the combustible mixture therein may be ignited, after which the refractory member is closed and latched shut, the cooperating faces of the refractory member 80 and the member 60 being so constructed as to form a substantially gas tight joint when the device is in operation, and as a result the escape of products of combustion into the surrounding atmosphere is substantially eliminated.

Each of the modifications thus far described, while it is much more efficient, than those ordinarily used, and while it is so constructed as to substantially eliminate the escape of the products of combustion into the surrounding atmosphere is nevertheless subject to one of the defects which is present in all forms of radiant heaters known to applicant, in that each of these forms of heaters is so constructed that it heats not only by radiation but also by convection.

That is, in the form of apparatus shown in Figs. 3, 4, 5 and 6 for example, it is obvious that inasmuch as the refractory element will be maintained, during operation, at a very high temperature, the air immediately adjacent that refractory element will be heated by direct conduction. As a result convection currents will be set up, this heated air rising and cooler air moving in to take its place so that there will be a flow of air over the surface of the refractory element, to cut down the maximum temperature that may be attained by the refractory element during operation of the apparatus. And since the radiation from the highly heated refractory element, other conditions being equal is directly dependent upon the temperature of that element it is evident that the decrease in temperature due to these convection currents will materially decrease the intensity of the radiations emanating from the heated refractory element.

As is well known our present methods of household heating are all based on the assumption that the entire body of air in the room or space to be heated shall be maintained at a temperature of approximately 70° Fahr. and all of the present types of heating systems are so designed that they depend, for their satisfactory operation, upon heating the entire body of air within the room or house, or whatever space they are used in connection with. This type of heating is unquestionably highly inefficient for after all the fundamental purpose of all heating systems is to make comfortable the people within the house, and it is a matter of indifference whether the walls of the room are warm or cold, and whether the air in the room is warm or cold, so long as the people in the room are comfortably warm. The correctness of this statement is well illustrated by what has been probably a universal experience. One may be entirely comfortable near a bonfire, for example, as a result of the radiant energy emanating from that bonfire, although the surrounding atmosphere may be at a temperature below freezing.

The radiant heaters heretofore devised have been used, primarily as supplementary or auxiliary heaters, and somewhat as makeshifts, our heating systems still being of that character in which the entire volume of air within the house is heated. But radiant heaters of the character shown and described herein are designed for functioning as the only heating apparatus used, and not primarily as makeshift or auxiliary apparatus to be used as supplementing the ordinary heating system. Where radiant heaters of this type are used entirely the efficiency of the heating apparatus will be considerably increased if it is so designed that the cooling of the refractory element as a result of convection currents is prevented. For a radiant heater is most effective when it functions entirely as such.

Figures 7, 8:
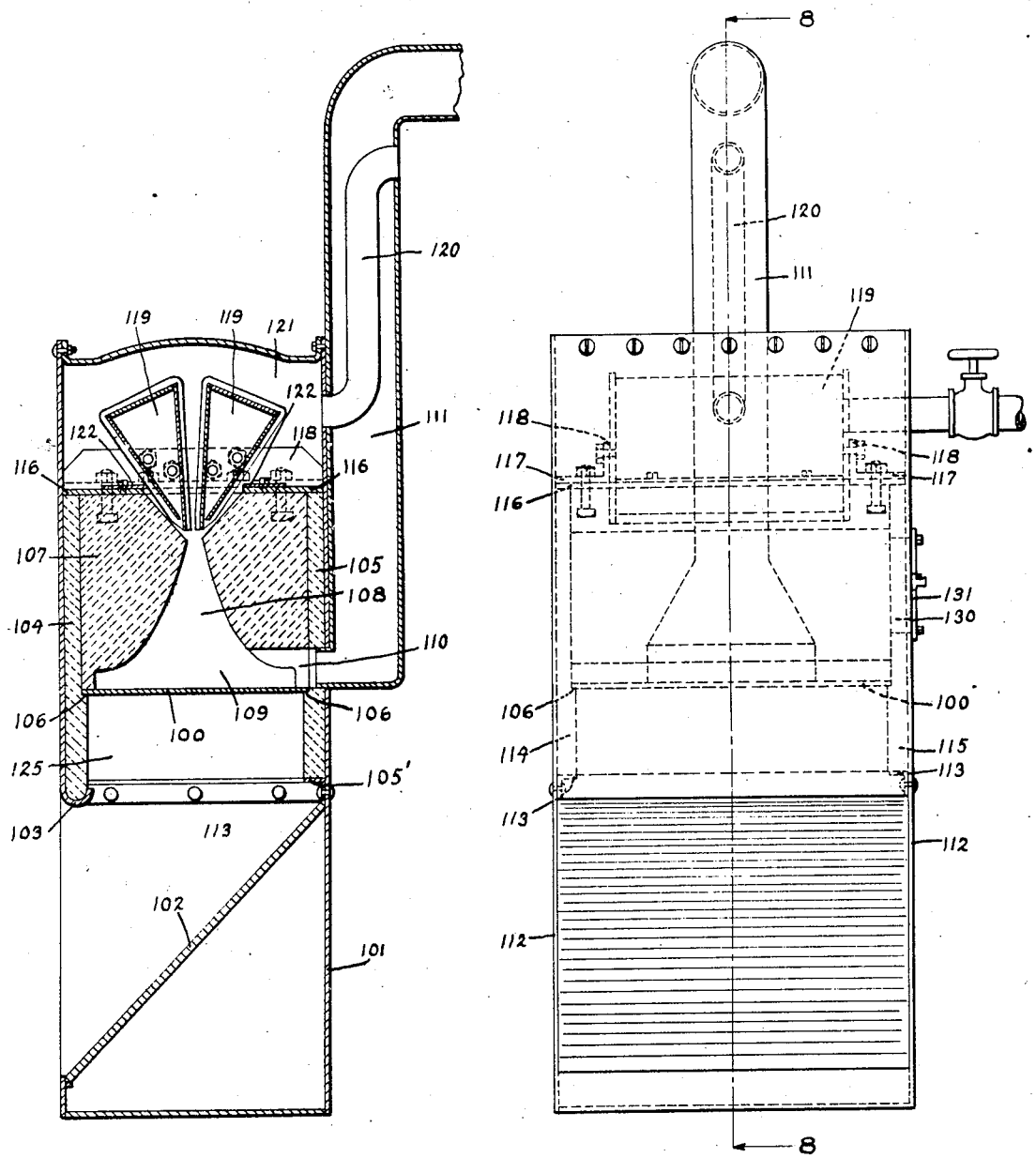
Fig. 7 is a front elevational view of still another form of apparatus, in which a reflector is employed.
Fig. 8 is a sectional view through the apparatus shown in Fig. 7 along the line 8—8 of Fig. 7.

In Figs. 7 and 8 is shown a modified form of heating apparatus in which these convection losses are prevented. In this form of apparatus the refractory or radiating element 100 is arranged in a horizontal position, instead of vertical, as is true in practically all radiant heaters heretofore used, and as is also true in the several modified forms of apparatus described above. The frame or body member 101 houses the burners, the combustion chamber and cooperating elements in the upper part thereof. The lower part of the front of the body or frame member 101 is cut away, and a reflector 102 of any desired material, preferably some material such as a sheet of burnished copper is provided, which is positioned to cooperate with the refractory element 100, the construction being such that the radiant energy emanating from the refractory element will be reflected by the member 102 in any desired direction. This reflector, as shown, consists of a flat sheet of metal, arranged at a suitable angle to reflect the heat waves. But, if desired, it may be made of a sheet of curved metal, or as a parabolic reflector, to concentrate, or spread, the heat waves as desired.

The lower edge of the front of the member 101, above the opening therein, is upturned as shown at 103 to constitute a lip or flange which supports a member 104, made of some refractory material such as fire clay, or the like. A suitable flange 105' is attached to the back of the body member 101, by riveting or in any other suitable manner, and this functions to support the refractory member 105. Also supported upon suitable flanges 113 carried by the ends 112 of the member 101 are refractory plates 114 and 115, corresponding to the plates 104 and 105. Each of the refractory members 104, 105, 114 and 115 is provided with a shoulder 106, which serves to support the refractory element 100. Supported upon the refractory element 100 and positioned between the members 104, 105, 114 and 115, is the member 107, which corresponds in construction and function to the member 60 shown in Fig. 6. That is, the member 107 is provided with a passage 108 which functions as the Venturi passage of the induction burner, the enlarged end 109 of the passage within the member 107 functioning as the combustion chamber, a suitable outlet 110, opening into the vent pipe 111 being provided through which the products of combustion may pass off to flue or stack. Supported upon the upper ends of the members 104, 105, 114 and 115 are two metallic plates 116, which have attached thereto two angle bars 117, the upstanding flange 118 of each of these bars serving as supporting means for the nozzle elements 119, each of these bars serving to support one end of each of the nozzle elements, these elements being attached to the bars by means of suitable bolts. The air for mixture with the gas to form a combustible mixture is introduced through the pipe 120, into the space 121, this pipe being positioned within the vent pipe 111 so that the hot products of combustion pass thereover and preheat the ingoing air.

Plates 122, which are slidably adjustable, are mounted on the plates 116, by means of which the opening through which air passes into the Venturi tube may be varied to give the desired control of the combustible mixture. The shoulders 106 are so positioned on the refractory elements 104, 105, 114 and 115 that the member 100 is inset, or spaced, a substantial distance from the lower edge or lip 103 of the front of the frame 101 so that a pocket or dead space 125 is provided beneath this refractory element. As a consequence of this construction the setting up of convection currents is prevented, for regardless of how highly heated the air within the pocket 125 may be, it will not, under any ordinary conditions, escape. Therefore undue cooling down of the member 100 is prevented and consequently higher temperatures of that element may be secured and a greater radiation of heat energy therefrom will result.

A suitable opening 130, for igniting the combustible mixture within the combustion chamber is provided, a cover plate 131 for closing off this opening during operation of the device, to thus prevent escape of the products of combustion into the atmosphere being also provided.

Inasmuch as the energy radiated from a highly heated body becomes effective to heat another body only when the energy vibrations strike such a body it is necessary, as is well known, that any radiant heater be so arranged that the energy waves thrown off therefrom shall impinge upon the person or other object to be heated. Where a room or house is provided with radiant heaters, such as those shown herein, they should be so positioned that the energy waves shall be transmitted therefrom in such wise as to strike upon the persons or objects in the room. Heretofore radiant heaters have been normally such as to be positioned upon the floor, the waves being thrown off substantially horizontally. Some of the electrical radiant heaters are portable so that they may be placed upon a table or other object, and directed upon the person to be heated. But if radiant heaters alone are used, and form a permanent heating apparatus in a room, the logical place to locate the heater is in the ceiling, so that the heat waves may be transmitted downwardly, just as is true with the heat energy transmitted from the sun.

Where the radiant heater is one of the type which operates upon electricity it would be, of course, a matter of no difficulty to so locate the heater, for the switch controlling the flow of current through the heating element might be located in a wall, at a convenient place, just as the switches for operating electric lights, attached to the ceiling, are now placed. But where the radiant heater utilizes gaseous fuel the problem is more difficult inasmuch as means must be provided for igniting the combustible mixture within the combustion chamber.

In Figs. 9 through 13 is shown apparatus of this character.

The general system is shown particularly in Fig. 9 in which numeral 200 designates the ceiling of the room, and the numeral 201 a side wall, both the ceiling and the wall being shown diagrammatically. Attached to the ceiling, in any desired manner, is a fixture which comprises a frame or body member 205, which is preferably cylindrical, as shown, though it may of course be given any desired configuration in order to lend itself to suitable ornamentation and to accord with the design, finish, and decoration of the room. This body member is provided adjacent the lower edge thereof and upon the inner side thereof, with a lip or flange 206, adapted to support the refractory element 207, which, as shown, is preferably formed of some satisfactory heat resisting metal, preferably, as described above, one of the now well known chromium nickel alloys, such as the commercially known "Q" metal. This refractory element may be given any desired shape or form, but as shown it is curved so as to spread the radiated heat-waves instead of concentrating them in a single spot. Also this refractory element is so positioned within the member 205 that a dead space or pocket 208, similar in function to the pocket 125, shown in Figs. 7 and 8, is provided so that the setting up of convection currents, with consequent undue cooling down of the refractory element, is prevented. Positioned within the member 200 is a heat interchanger consisting of two metallic plates 210 and 211, which are held in suitably spaced relation by means of pipes or tubes 212, these tubes at one end opening into the combustion space 213 formed between the plate 210 and the refractory element 207, and at the other end opening into the space 214 to which is connected the vent pipe 215. Carried by the plate 211 are two depending concentric flanges 220 and 221, while carried by the plate 210 is an upstanding flange 222, arranged concentrically with the flanges 220 and 221, which is so positioned that it extends upwardly into the space between the two depending flanges 220 and 221. Opening through the member 205 adjacent the upper end thereof is a plurality of air inlet openings 225. Positioned within the depending wall 221, is the Venturi element 226, of the burner, this element, as in the various modifications shown above constituting one of the elements of an induction burner, the nozzle 227, connected to the gas supply pipe, constituting the other element. This Venturi element 226 is so arranged that its lower end opens into the combustion space 213 while its upper end is connected, by means of passages or openings 229, to the space inside the depending flange 221. This construction just described is such that air entering the ports 225 must pass downwardly around the depending flange 220 thence upwardly around the upstanding flange 222, and then downwardly again around the depending flange 221 and thence upwardly again to pass through the passages or openings 229 into the induction burner where it is mixed with gas, the resulting combustible mixture being burned within the combustion chamber 213. The resulting hot products of combustion pass upwardly through the pipes or tubes 212 into the chamber 214 whence they escape through the pipe 215 to the flue or stack. The apparatus thus described constitutes a heat interchanging apparatus adapted to transfer a substantial quantity of the sensible heat of the hot products of combustion into the ingoing air to preheat that air as it passes on its way to the induction burner.

As shown, electrically operated means is provided for igniting the combustible mixture issuing from the induction burner, this means consisting of a spark plug 235, the terminals of which are connected by suitable conductors 236 and 237 to the high tension terminals of a spark coil 238, which is illustrated diagrammatically inasmuch as any suitable type of spark coil will function satisfactorily. One of the low tension terminals of the spark coil is connected by means of the conductor 240 to one pole of a battery 241, or to some other suitable source of electrical potential, and the other terminal is connected, by means of the conductor 242, to the other terminal of the said battery, or other source of potential. Positioned within the conductor 242 is a switch comprising the thermostatic element 243, adapted to cooperate with the fixed contact members 244, the construction being such that the element 243 is at ordinary temperatures in contact with the member 244, but when its temperature is raised above a predetermined point it will be so deformed as to break contact with the element 244 and thus open the switch. This switch is, preferably, so positioned that the element 243 is located within the chamber 214, or flue 215, where it is subjected to the hot products of combustion. The construction is such that when the heater is not operating, and the element 243 is therefore at normal temperatures, that element will contact with the cooperating element 244, but as soon as the combustible mixture is ignited and the hot products of combustion passes over this element 243, it will be deformed to break contact with the element 244. Also positioned within the conductor 242 is a second switch designated generally by the numeral 245, which may be of any suitable construction. This switch is intended for manual operation and is shown diagrammatically as a knife switch, although it may of course be of the conventional turn button, or push button, character.

A valve 250 is positioned within the gas supply pipe 228 to control the supply of gas to the burner.

In the operation of the device the valve 250 is manipulated to permit the passage of gas under suitable pressure, and in suitable quantity, to the nozzle 227, the pressure gas issuing from this nozzle acting to draw in a proper quantity of air for the formation of a combustible mixture, this mixture passing out through the Venturi element 226 into the combustion chamber 213. Inasmuch as the thermostatic element 243 is at this time at normal temperatures it is in contact with the element 244, but the switch 245 is at this time open, or in off position. The gas valve 250 having been manipulated to supply gas to the burner, the switch 245 is then properly manipulated to close the circuit through the induction coil 238. Immediately the spark plug 235 will be caused to give off electrical sparks to ignite the combustible mixture. As the hot products of the combustion pass over the thermostatic element 243 it will be deformed to open the circuit through the induction coil, even though the switch 245 still remains in closed position. As a result the induction coil will be cut out of operation as soon as the gas is ignited.

But, the arrangement is such that, with the switch 245 left in closed position, if for any reason the combustible mixture should go out, as might happen if the supply of gas should momentarily cease, or vary in quality so that a combustible mixture no longer was obtained, then the element 243 would again contact with the element 244 to energize the spark plug and cause sparks to emanate from the spark plug. As soon as, therefore, a combustible mixture again exists at the burner this mixture will be ignited. In this way dangers resulting from the gas going out are eliminated.

If desired one element of the switch 245 may be attached to the valve 250 so that when that valve is opened to supply gas to the heater the switch 245 will be closed, and the ignition of the gas thus automatically secured as the valve controlling the gas is opened. Such a form of switch is shown, somewhat diagrammatically, in Figs. 11, 12 and 13. In this type of switch one contact member 260 is attached to the rotary stem 261 of the valve 250′, so that it will move therewith. The other contact member is held stationary—one suitable construction being that shown in which this member, 262, is carried by the gas supply pipe 228. As the valve is rotated to admit gas to the burner the contact member 260 is brought into contact with the other contact member 262 to cause energizing of the spark coil, with ensuing functioning of the spark plug. The arrangement is such, as shown most clearly in Fig. 13, that the switch is closed as the gas controlling valve begins to open and remains closed regardless of further manipulation of the valve, so long as the valve is maintained in open position. For the positioning of the valve will, in practice, be varied to control the amount of gas being fed to the heater. And to facilitate proper control of the valve the face plate 265 is provided with suitable markings, with which the pointed element of the operating handle 266 cooperates to indicate the degree of opening of the valve.

As stated above, the radiant heaters heretofore generally used have been supplementary to the regular heating system. The heating system described herein is intended as the sole heating system used in the house, or other place to be heated. And while this heating system is illustrated as comprising, as the radiating element thereof, a gas heater, any other suitable type of radiating element might be used.

Furthermore, as many radiating elements might be used in any one room as may be desirable. In a large room it might be desirable to have several of these elements, so that the heat waves emanating therefrom might be so spread out as to insure comfort to persons in the room, regardless of what positions in the room they might occupy. In addition, although the heating system has been illustrated as comprising only a single heating element, and only parts of the ceiling and side wall of the room in which that element is located are shown, nevertheless the system is applicable to any size room, or to any number of rooms.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. Heating apparatus of the character described comprising a combustion chamber, an imperforate refractory element overlying said combustion chamber, means for burning a fuel within said combustion chamber to bring the products of combustion into contact with the inner side of the refractory element, and means for preventing the passage of convection currents over the outer side of said element.

2. A heating apparatus of the character described, comprising an imperforate refractory element; and means for preventing the passage of convection currents over the radiating surface of said element.

3. In a radiant heater, of the character described, an imperforate refractory element; a combustion chamber associated therewith, means for introducing air and gas into said chamber to form a combustible mixture for burning to heat said refractory element; a vent pipe connected to said chamber through which the products of the combustion escape, a recuperator associated with said vent pipe, and with the means for introducing air to said combustion chamber, to preheat said air; the construction of the apparatus being such as to prevent escape of the products of the combustion into the surrounding atmosphere.

4. In a radiant heater, a refractory element; and a depending flange surrounding said element to form a pocket adapted to prevent the passage of convection currents over said element.

5. In a radiant heater, a horizontally arranged refractory element; and a depending flange surrounding said element to form a pocket adapted to prevent the passage of convection currents thereover.

6. In a radiant heater, a horizontally arranged refractory element; a depending flange surrounding said element to form a pocket adapted to prevent the passage of convection currents thereover, and a reflector associated with said refractory element to reflect and direct the heat radiations emanating from said refractory element.

7. In a radiant heater, an imperforate refractory radiating element; a combustion chamber associated therewith, means for introducing a combustible mixture into said combustion chamber for burning to heat the said element; means for preventing the escape of the products of the combustion into the surrounding atmosphere; and means for preventing the passage of convection currents over said refractory element.

8. Heating apparatus of the character described, comprising an imperforate radiating element; a combustion chamber associated with said element, means for burning a fuel within the said combustion chamber to bring the products of combustion into contact with the inner side of said element to effect heating thereof; and means for preventing the passage of convection currents over the other side of said element.

In testimony whereof I hereto affix my signature.

HARRY F. SMITH.